United States Patent
Merline

(10) Patent No.: US 7,310,905 B2
(45) Date of Patent: Dec. 25, 2007

(54) CONTROLLABLE FISHING LURE

(75) Inventor: Paul K. Merline, Eureka, MO (US)

(73) Assignee: Paul K Merline, Eureka, MO (US)

( * ) Notice: Subject to any disclaimer, the term of this patent is extended or adjusted under 35 U.S.C. 154(b) by 0 days.

(21) Appl. No.: 11/132,929

(22) Filed: May 19, 2005

(65) Prior Publication Data

US 2005/0257418 A1    Nov. 24, 2005

Related U.S. Application Data

(60) Provisional application No. 60/572,368, filed on May 19, 2004.

(51) Int. Cl.
*A01K 85/00* (2006.01)

(52) U.S. Cl. ...................................... 43/26.2

(58) Field of Classification Search ................ 43/26.1, 43/26.2
See application file for complete search history.

(56) References Cited

U.S. PATENT DOCUMENTS

| | | | | |
|---|---|---|---|---|
| 5,165,193 A * | 11/1992 | Dankwardt | ................. | 43/26.1 |
| 5,201,884 A * | 4/1993 | Nicholas | ..................... | 43/26.1 |
| 5,293,712 A * | 3/1994 | Lo | .............. | 43/26.1 |
| 5,309,664 A * | 5/1994 | Wright | ........................ | 43/26.1 |
| 5,361,530 A * | 11/1994 | Kashani et al. | .............. | 43/26.1 |
| 6,389,732 B1* | 5/2002 | Daniel | ......................... | 43/4.5 |
| 6,520,105 B2 | 2/2003 | Koda et al. | ................. | 114/255 |
| 6,631,581 B2 | 10/2003 | Gomes et al. | .............. | 43/26.2 |
| 6,647,659 B1 | 11/2003 | King et al. | .................. | 43/17.6 |
| 6,684,556 B1 | 2/2004 | Arbuckle et al. | ............ | 43/17.1 |
| 6,804,909 B1 | 10/2004 | West | .......................... | 43/17.1 |
| 6,807,766 B1 | 10/2004 | Hughes et al. | .............. | 43/17.6 |
| 6,820,366 B1 | 11/2004 | McDermott | ................ | 43/42.22 |
| 6,836,997 B2 | 1/2005 | Cramsey | .................... | 43/43.14 |
| 2005/0102883 A1* | 5/2005 | Temes | ........................ | 43/26.1 |

* cited by examiner

*Primary Examiner*—Kurt Rowan

(57) ABSTRACT

The present invention relates to a controllable fishing lure. The lure is remotely controlled by the angler by a radio control transmitter on the fishing rod or proximate thereto. The lure can be steered by depressing buttons on the radio control transmitter. The depressions cause radio signals to be emitted from the transmitter, these signals corresponding to the movements desired by depressing the buttons. The radio signals from the transmitter are then received by a receiver, through an antenna, in the lure. The received signals are then processed by a controller that activates propellers, disposed on the lateral sides of the lure, whereby the lure is steered to the desired location in the water.

6 Claims, 4 Drawing Sheets

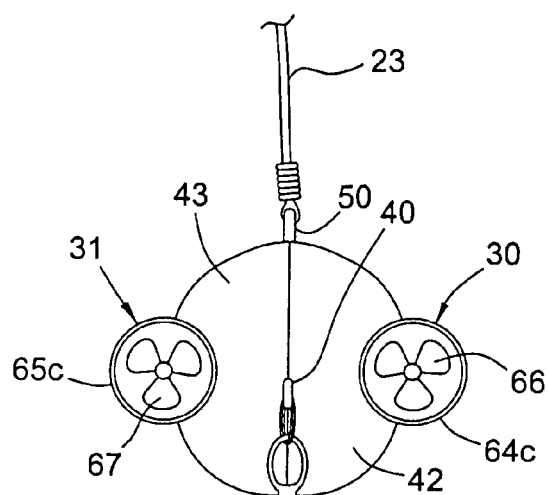
Fig. 4.
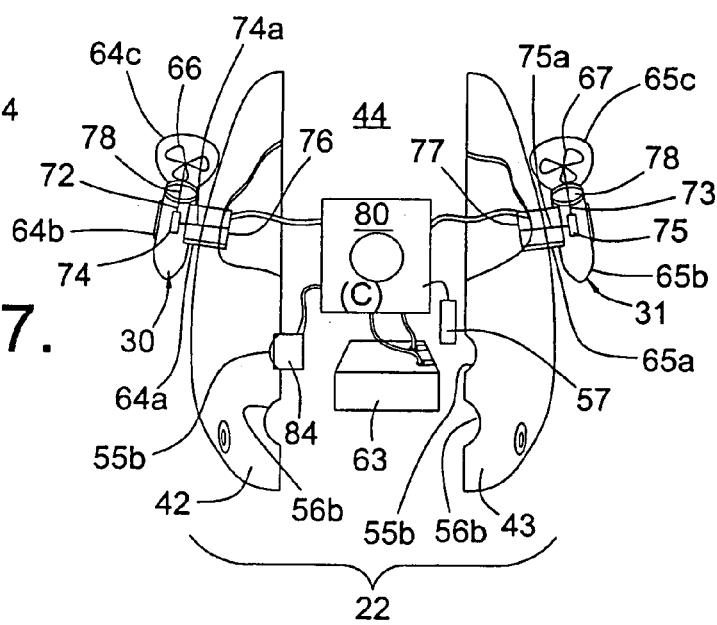
Fig. 7.
Fig. 8.

CONTROLLABLE FISHING LURE

CROSS REFERENCES TO RELATED APPLICATIONS

This application is related to and claims priority from U.S. Provisional Patent Application Ser. No. 60/572,368, entitled: CONTROLLABLE FISHING LURE, filed on May 19, 2004. This U.S. Provisional Patent Application, Ser. No. 60/572,368, is incorporated by reference herein.

BACKGROUND OF INVENTION

The invention relates generally to fishing lures. In particular, the present invention is directed to fishing lures that are remotely controllable by the angler.

Sport fishing, and in particular bass fishing, is surging in popularity. As the desire to catch these fish more scientifically and expeditiously has increased, so has the use of lures. These lures simulate the appearance of bait and are typically more attractive to fish than simply baited hooks.

Conventional lures exhibit several drawbacks, as they are problematic in numerous situations. For example, bass tend to congregate in strike zones, which are typically near and under docks, boats, or in weeded and shallow areas of ponds, lakes and the like. Only an extremely skilled and experienced angler can consistently cast into these areas where the strike zone is located. Moreover, in many cases, these strike zones are simply inaccessible to all anglers, regardless of skill. Additionally, even when these lures successfully reach these strike zones, they typically become stuck, attaching to structures, such as tree limbs, branches and docks, or get caught in weeds.

SUMMARY OF THE INVENTION

The present invention improves on the contemporary art by providing a lure that may be controllable by the angler. As a result, the lure can reach the strike zone for the fish on every cast. This is true even where the strike zone would normally be inaccessible to conventional lures, such as under docks or boats, occluded by tree limbs and branches, or in weeds.

Moreover, the lure may be controllable, such that it can be placed into the strike zone by steering it into the strike zone, as opposed to being cast into it. This negates the need to make precision casts and allows less skilled anglers to be even with more skilled and experienced anglers.

The lure may be remotely controlled by the angler by a radio control transmitter on the fishing rod or proximate thereto. The radio signals from the transmitter may be received by a receiver, through an antenna, in the lure. These signals may allow the angler to control the lure by steering it. Steering may be accomplished by activating propellers, located on opposite sides of the body of the lure. The propellers may be activated at various speeds in various combinations, as controlled by a controller, such as a processor, to steer the lure in the desired direction.

Additionally, the lure may be steered by propellers, protruding from the sides of the body. These propellers, upon steering, may stir the water. This stirring of the water, coupled with the balancing of the lure on the line, can mimic a lame or wounded fish attracting sport fish, such as bass. With bass, for example, the attraction is typically strong enough that the bass will strike the lure, whereby it catches one of the hooks, to be caught by the angler.

An embodiment of the invention is directed to a controllable fishing lure. This lure may have a body of a shape recognizable to aquatic animals, for example, a fish shape, and a first propeller and a second propeller, that are disposed on opposite sides of the body. There may be motors in operative communication with each of the first propeller and the second propeller. There may also be a receiver for receiving first signals, for example, radio signals, corresponding to a user-desired direction of movement for the fishing lure, and for creating second signals, for example, electrical signals, that correspond to the first signals. The receiver may then send the second signals to a controller for causing the controller to activate at least one of the motors in accordance with the user-desired movement for the fishing lure. The controller may be electrically linked to the receiver and each of the motors. The controller may control the operation of the motors for each of the first propeller and the second propeller in response to the second signals received from the receiver. The lure may be typically controlled remotely by a remote control unit, that sends first signals, for example, radio signals, that are received by the receiver in the lure.

Another embodiment of the invention is directed to a controllable fishing lure formed of a body that is buoyant in water, so that the fishing lure floats at least proximate to the surface of the water. The fishing lure may also include a movement system for moving the body in water, the movement system including at least one propulsion mechanism. For example, the movement system may include motors that power propellers, which propellers may define the propulsion mechanism. There may be a receiver for receiving first signals corresponding to a user-desired direction of movement for the fishing lure. The receiver may create second signals corresponding to the first signals, and it may send the second signals to a controller for causing the controller to activate the movement system in accordance with the user-desired movement for the fishing lure. There may also be a controller that is electrically coupled to the receiver and the movement system. The controller may control the operation of the movement system in response to the second signals received from the receiver.

There are also disclosed methods for using the fishing lures of the invention. These methods may involve placing the fishing lure into a body of water, and sending signals to the fishing lure that correspond to the desired direction in which the fishing lure is to be maneuvered. These signals may be radio signals, and they may be sent from a remote control device.

BRIEF DESCRIPTION OF THE DRAWINGS

Attention is now directed to the drawings, where like numerals or characters indicate corresponding or like structures. In the drawings:

FIG. 4 is a rear view of the lure of FIG. 2;

FIG. 7 is an exploded view of the lure of FIG. 2;

FIG. 8 is a schematic diagram of the movement system of the lure in accordance with an embodiment of the invention.

DETAILED DESCRIPTION OF THE PREFERRED EMBODIMENT

The present invention relates to a fishing lure or other fish attracting structure that can be controlled by the angler in order that it be steered and/or maneuvered into the desired location or strike zone for catching fish. The lure is typically steered by remote control, with the remote control device typically on the fishing rod or a hand held device.

Figure 1:
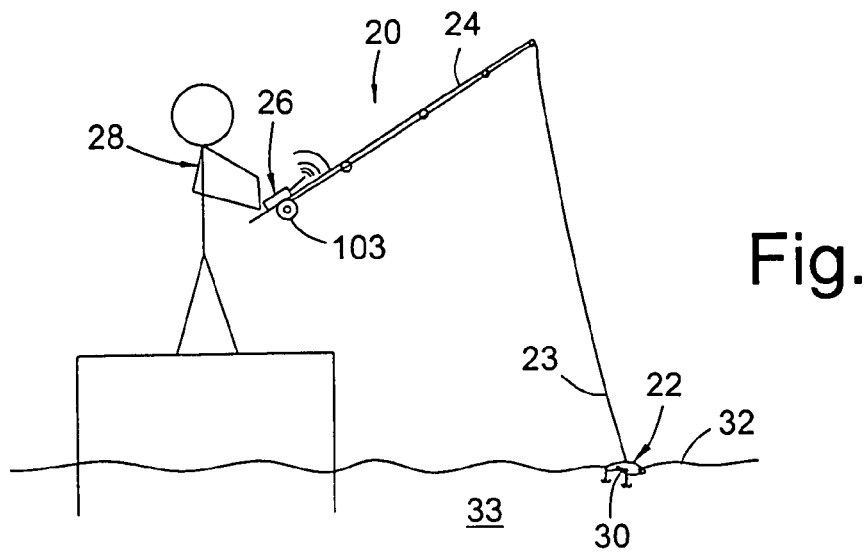
FIG. 1 is a perspective view of the invention in an exemplary use.

FIG. 1 shows the apparatus 20 of the invention in an exemplary operation. The apparatus may include a lure 22 held on a line 23, extending from a fishing rod 24. A remote control unit 26, for example, a radio-transmitting unit, may typically be mounted on the fishing rod 24, and it may be controlled by an operator or user 28. The lure 22 may include laterally disposed propeller units 30, 31 (FIG. 3), allowing it to be steered. The lure 22 is, for example, a top water lure, for running at or just below the surface 32 of the water 33. The lure 22 is balanced with respect to the fishing line 23 such that coupled with the noise from the propeller units 30, 31, the appearance of a lame or wounded fish may be mimicked. Accordingly, the lure 22 is suitable for catching sport fish, such as bass.

Figure 2:
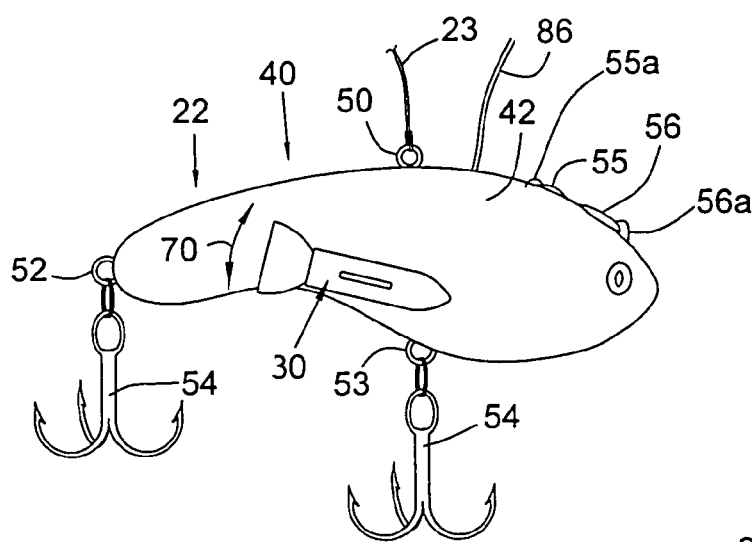
FIG. 2 is a side view of a lure in accordance with an embodiment of the invention.
Figure 3:
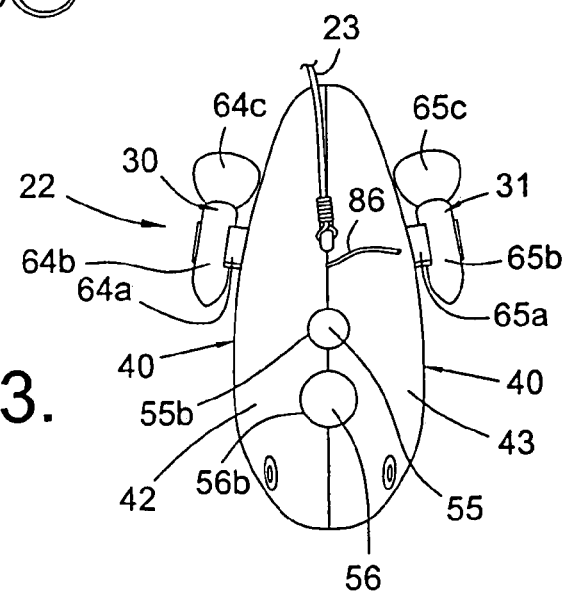
FIG. 3 is a top front perspective view of the lure of FIG. 2.

Turning also to FIGS. 2-4, the lure 22 is formed of a body 40, for example, in the shape of a fish (to which anatomical references will be made hereinafter for explanation purposes). Additionally, in this document, the terms upper, lower, front, rear, lateral and other positional terms are used in describing the lure 22 and components associated therewith, in a typical exemplary operation. The aforementioned terms are used for description and explanation purposes only and are otherwise not limiting.

The body 40 may typically be formed of shells 42, 43. These shells 42, 43 may typically be symmetric and may be snap-fit, friction-fit or the like to each other. These shells 42, 43 are such that when together, form a water-tight seal, keeping the cavity 44, formed by the interior of the shells 42, 43, water-tight, to prevent damage to the operational components (shown in FIG. 5 and detailed below). The shells 42, 43 can be made of plastic, polymeric material or any other material that is water proof. The shells 42, 43 of the body 40 may be weighted such that with all of the internal and external components detailed below, the lure 22 is buoyant in water, such that it can float at or near the surface of the water. However, other weightings for the shells 42, 43 of the body 40 may be possible, depending on the buoyancy and ultimate depth for the lure 22 desired.

The body 40 includes eyelets 50, 52 and 53. These eyelets 50, 52 and 53 may typically be attached to the body 40 mechanically, by adhesives, mechanical fasteners or combinations thereof.

An eyelet 50 for receiving the line 23 of the fishing rod 24, may be on the upper or dorsal side of the body 40 of the lure 22. This eyelet 50 may be positioned on the upper or dorsal side of the body 40, at a substantially central location on the body 40, such that the body 40 is balanced when in the water. The balancing is typically such that the lure 22 wiggles when it is placed into the water 33, mimicking the movement and behavior of a lame or wounded fish.

Eyelets 52, 53 may typically accommodate hooks 54. One eyelet 52 may be positioned at the rear end or tail of the body 40, while the other eyelet 53 may be positioned on the lower or ventral side of the body 40. These hook supporting eyelets 52, 53, may be positioned to maintain the balance of the lure 22 in the water 33. Additional hook supporting eyelets (with hooks) can be positioned anywhere along the body 40, provided they maintain the balance of the lure 22, when in the water 33. Similarly, a single hook supporting eyelet may be placed on the body 40 at any position, provided the balance of the lure 22 is maintained when the lure 22 is in the water.

Caps 55, 56 may also be attached to the body 40, by their respective lines or tethers 55a, 56a. These caps 55, 56 may typically be on the dorsal or upper side of the body 40, and may frictionally fit into their respective openings 55b, 56b on the body 40. These friction fits form watertight seals, keeping the cavity 44 free of water.

One cap 55 may cover a switch unit (SW) 57, that includes a switch 57a. The switch 57a may typically be movable between various positions, typically the ON and OFF positions. With the switch 57a in the ON position, the lure 22 may be activated and ready for deployment to the desired location (in the strike zone). With the switch 57a in the OFF position, the lure 22 may be deactivated, typically for the time being until activated and/or recharged.

Figure 5:
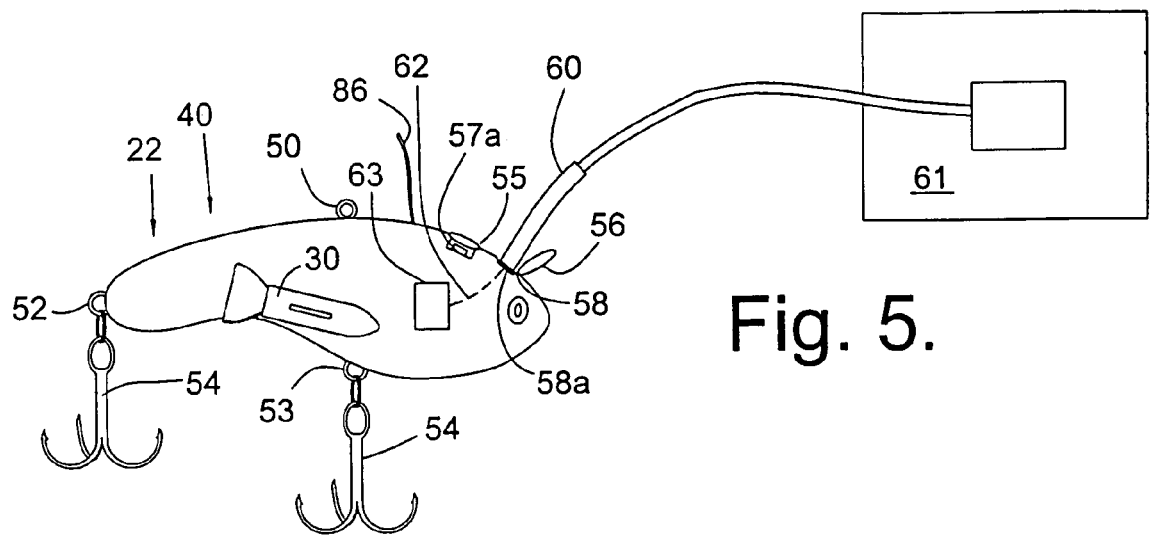
FIG. 5 is a perspective view of the lure of FIG. 2 showing the battery being recharged.

The other cap 56 may cover a port 58. The port 58, exposed (open) when the cap 56 is removed, may include a socket 58a for receiving an electrical line 60 from a charging unit 61, as shown in FIG. 5. As shown in this figure, the electrical line 60 of the charging unit 61 may electrically connect to an internal electrical line 62 in the body 40, for charging the power source 63. The power source 63 may be one or more batteries, that may power the internal components in the body 40.

Figure 5A:
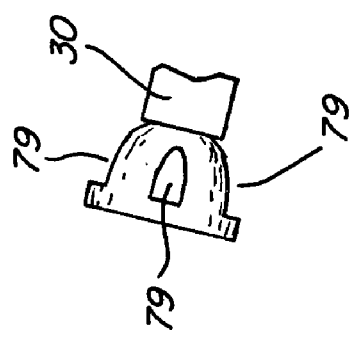
FIG. 5A is a partial side elevation of the propeller unit of the lure in FIG. 2.

Propeller units 30, 31 may extend from the sides of the body 40 of the lure 22 as shown in FIGS. 3 and 4. The propeller units 30, 31 may include arms 64a, 65a, that extend from the body 40. These arms 64a, 65a may join to housings 64b, 65b, that typically envelope propellers 66, 67. The ends of the housings 64b, 65b may protrude outward to form propeller guards 64c, 65c over the propellers 66, 67. FIG. 5A shows an example of one propeller unit including cutouts 79 on the propeller guard 64c, 65c. These cutouts allow the water to flow through the propeller guard 64c, 65c as the lure is moved through the water.

Figure 6B:
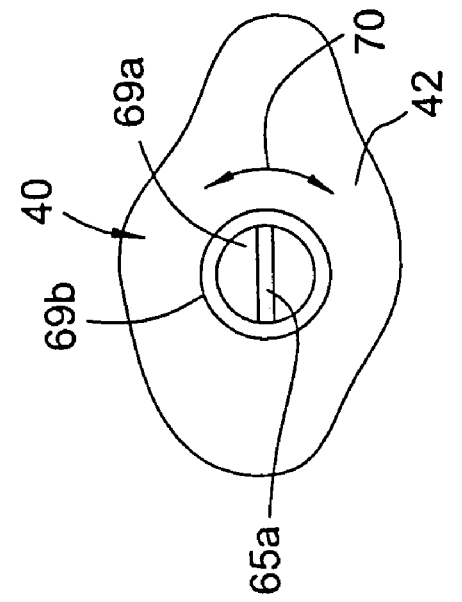
FIGS. 6A and 6B are side views of the mounting structure for the propeller units of the lure of FIG. 2.
Figure 6A:
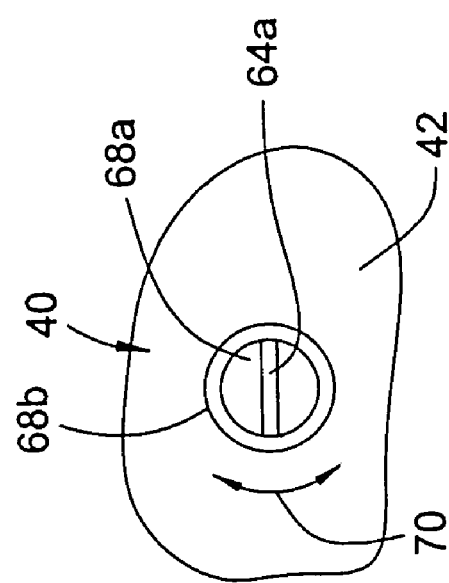

As shown in FIGS. 6A and 6B, the arms 64a, 65a may be attached to circular members 68a, 69a, typically circular plates or cylinders, that may be frictionally engaged in gaskets 68b, 69b. This frictional engagement, coupled with stops or other motion restrictors on the plates, cylinders and/or the shells 42, 43, are such that the propeller units 30, 31 can be moved, typically manually, in the direction of the double headed arrows 70, at any desired rotational angle. For example, the aforementioned arrangement can be such to provide the propeller units 30, 31 with an approximately 30 degree rotation, approximately plus or minus 15 degrees with respect to the horizontal. Another example may be to provide the propeller units 30, 31 with an approximately 60 degree rotation, approximately plus or minus 30 degrees with respect to the horizontal. This structure can also be configured, such that by lacking the aforementioned stops or motion restrictors, 360 degree rotations of the propeller units 30, 31 are permissible.

Turning also to FIGS. 7 and 8, the propellers 66, 67 may be mounted on geared shafts 72, 73 driven by gears or gear mechanisms 74, 75, on shafts 74a, 75a, that are in turn, driven by the respective motors (M1, M2) 76, 77. Gaskets 78 (single or multiple per side of the lure 22, only one shown per side), that prevent water from entering the cavity 44, through the propeller units 30, 31, may typically be in the propeller housings 64b, 65b, but can also be in the arms 64a, 65a or in the circular members 68a, 69a, where the arms 64a, 65a attach thereto.

The motors (M1, M2) 76, 77 may be operable independently of each other and may be controlled by a controller (C) 80, that is, for example, a processor or microprocessor, for example, a Pentium processor. The controller (C) 80 may typically be preprogrammed to control the motors (M1, M2) 76, 77, to allow the lure 22 to make turns and travel forward and backward, in accordance with the signals received from the remote control unit 26 (detailed below). The controller (C) 80 may be electrically coupled to the switch (SW) 57, so it may be turned on and off by the operator or user 28. The motors (M1, M2) 76, 77 may also be electrically coupled to the power source 63, as may the controller (C) 80 and the receiver 84.

A receiver 84, for example, a radio receiver, may be electrically coupled to the controller (C) 80. An antenna 86 may extend from this receiver 84, and may typically protrude from the body 40 of the lure 22. The area of the shells 42, 43, from where the antenna 86 extends out of the body 40, may typically be sealed, such that water is prevented from entering the cavity 44.

Figures 9, 9A:
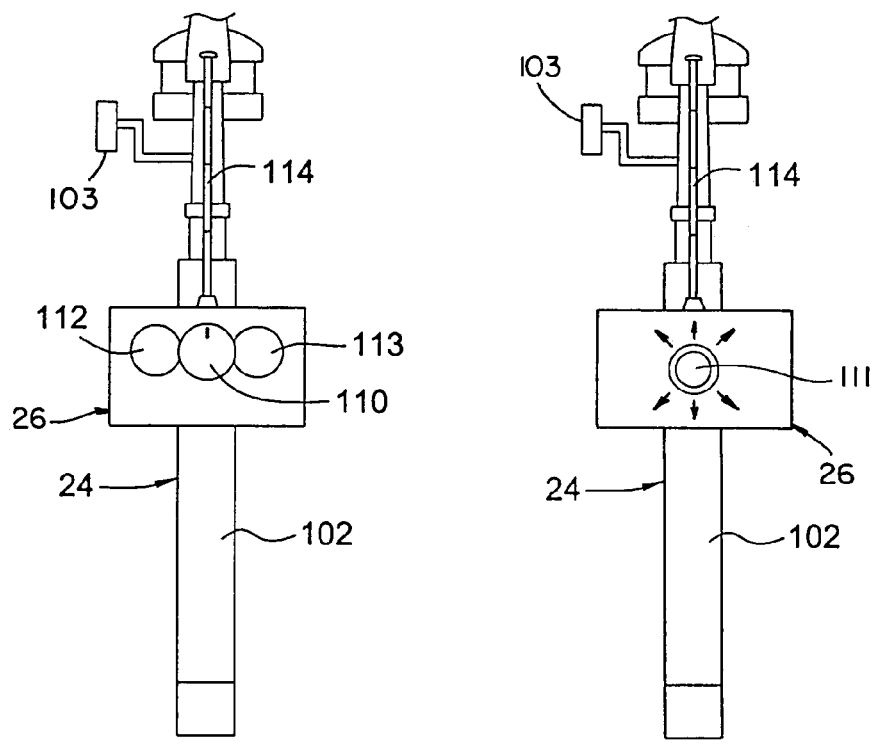
FIG. 9 is a top view of a remote controller of the present invention as used on a fishing rod.
FIG. 9A is a top view of another embodiment of a remote controller of the present invention as used on a fishing rod.

Turning now to FIG. 9, the remote control unit 26 is shown attached to the fishing rod 24. This remote control unit 26 is shown mounted, for example, in a temporary mount, on the handle 102 of the fishing rod 24, typically proximate to the reel 103 and its handle 104. The remote control unit 26 may also be mounted in other ways that provide the user easy access to the controls. The remote control unit 26 may include buttons 110 (central), 112 and 113 (lateral), that can be controlled by a single thumb of a user or angler, allowing the lure 22 to be steered. Depressions of the central button 110 over the respective movement of the central button 110, may cause various depressions of the lateral buttons 112, 113, that in turn, result in the remote control unit 26 emitting radio signals from its antenna 114. These emitted radio signals may correspond to the depressions of the buttons 112, 113, that correspond to the desired steering directions for the lure 22. The signals may be received by the antenna 86, and therefore, the receiver 84, of the lure 22. These received signals may be processed by the controller (C) 80, that signals the requisite action of one or both motors (M1, M2) 76, 77, that power the requisite propeller(s) 66, 67 to operate, such that the lure 22 is steered in correspondence to the received signals.

FIG. 9A shows an alternate remote control unit 26 that replaces the arrangement of buttons 110, 112 and 113, with a single button or joystick 111 with 360 degree motion capability, that can be depressed such that the depressions result in signals corresponding to the desired steering directions. This single button could be a thumb-controlled button or the like. Similarly, the button arrangement (of buttons 110, 112 and 113), as well as the single button, can be replaced by a joystick or similar mechanism. The remote control unit 26 mounted on the fishing rod 24 in the manner similar to that shown in FIGS. 9 and 9A is important because it allows the operator or user 28 to guide the lure 22 with the hand that holds the fishing rod 24 while keeping the other hand free to reel in a catch.

An exemplary operation of the apparatus 20 will now be described, making reference to FIGS. 1-9.

Initially, the lure 22 may be attached to a fishing line 23 of a fishing rod 24, that includes a remote control unit 26 mounted on the fishing rod 24 near the user's hand. The lure 22 may be activated by the operator or user 28 by moving the switch 57a of the switch unit (SW) 57 (having opened the cap 56) to the ON position. The cap 56 may then placed over the opening 56b, sealing and closing it. At any time the user has the lure 22 in their possession, the user can move the propeller units 30, 31 to the desired positions, by moving them in accordance with the double headed arrows 70. The lure 22 may then be placed into the water 33, typically by casting the fishing rod 24. Alternatively, the lure 22 could just be dropped into the water 33. The lure 22 floats at or proximate to the surface of the water 33.

Once in the water 33 from the cast or drop, the lure 22 may be steered to the desired location by various depressions of central button 110, over the lateral buttons 112, 113, on the remote control unit 26. The depression of the central button 110, may depress the lateral buttons 112, 113 for steering the lure 22. In particular, the various resultant depressions of the lateral buttons 112, 113 may cause the remote control unit 26 to emit radio signals from its antenna 114 that may be received by the antenna 86, and therefore, the receiver 84, of the lure 22, with the signals corresponding to the desired steering for the lure 22. Alternatively, these signals corresponding to the desired steering for the lure 22 may be produced by manipulation of the single button or joystick 111 over its range of motion. These received signals may be processed by the controller (C) 80, that may signal the requisite action of one or both motors (M1, M2) 76, 77, that may power the requisite propeller(s) to operate, such that the lure 22 may be steered in correspondence to the received signals.

For example, a depression of central button 110, to the left, in order for the lure 22 to make a left turn, results in the lateral button 112, being depressed, and a signal being sent that will activate the right motor (M1) 76, causing the lure 22 to turn left. Similarly, should a right turn be desired, the depression of the central button 110 is such that the lateral button 113 is depressed, resulting in a signal being sent to the lure 22, that activates the left motor (M2) 77, causing the lure 22 to turn right. Similarly, should the distal portion of the central button 110 be depressed, whereby both lateral buttons 112, 113 are depressed, signals will be sent to the lure 22 activating both motors (M1, M2), such that the lure moves forward and straight.

Additionally, should the proximal portion of the central button 110 be depressed, whereby both lateral buttons 112, 113 are depressed, signals will be sent to the lure 22 activating both motors (M1, M2), such that the lure moves backward and straight. Various combinations of any of the aforementioned four movements (central button 110 depressions) are possible in order to steer the lure 22 as desired, for example, straight forward, forward right, right, reverse right, straight reverse, forward left, left, reverse left, and combinations thereof.

While being steered to a desired location or strike zone, as well as maneuvered in the strike zone, the propellers 66, 67 upon their rotation may cause surface noise. This surface noise, coupled with the wiggling from balancing, may cause the lure 22 to appear to fish, such as bass, as a lame or wounded fish, at which they will strike.

The lure 22 may typically be operable for fifteen minute time periods. After such a time period, it may be removed from the water, where its cap 55 may be removed. The switch 57*a*, under the first cap 55 may be moved to the OFF position. The cap 55 may then be placed over the opening 55*b*, so as to be engaged thereon, to form a water-tight seal.

The second cap 56 may then be removed. A line 60 from a charging unit 61 may be plugged into the socket 58*a* at the port 58 of the body 40 and the power source 63 may be recharged. Once the lure 22 is charged, the cap 56 may then be placed over the opening 56*b*, so as to be engaged thereon, to form a water-tight seal.

An activated lure 22 (switch 57*a* in the ON position) may again be cast or dropped. Once cast or dropped, it may be steered to the desired location (in the strike zone), by depressing the controls on the remote control unit 26 as detailed above. This process can be repeated for as many times as desired.

There has been shown and described at least one preferred embodiment of a fishing lure and system for its use. It is apparent to those skilled in the art, however, that many changes, variations, modifications, and other uses and applications for the systems and their components are possible, and also such changes, variations, modifications, and other uses and applications which do not depart from the spirit and scope of the invention are deemed to be covered by the invention, which is limited only by the claims which follow.

What is claimed is:

1. A controllable fishing lure comprising:
   a lure body having correspondingly configured shells designed to resemble a fish, said shells define an internal watertight cavity;
   said lure body having connection point for attachment of a fishing line and a further plurality of connection points each having a hook mounted thereon;
   said cavity housing a battery unit, an on/off switch, a recharge port, a receiver, and a controller, all of which are electrically connected;
   a first propeller and a second propeller mounted on opposite sides of the lure body, said first propeller connected to a respective first geared shaft and second propeller connected to a second geared shaft;
   a first motor operatively connected to said first geared shaft and a second motor operatively connected to said second geared shaft;
   said receiver for receiving a first signal corresponding to a user-desired direction of movement for the fishing lure, the receiver configured for creating a second signal to said controller for causing the controller to activate at least one of said motors in accordance with the user-desired movement of the fishing lure;
   said controller in operative communication with said receiver and each of said motors and being configured for controlling operation of said motors for each of the first propeller and second propeller in response to a second signal received from said receiver such that said first and second propellers are rotatably moveable with respect to the lure body to cause movement of the lure body in the water.

2. The fishing lure of claim 1 additionally comprising a single thumb-controlled button remote control unit for sending the first signals.

3. The fishing lure of claim 2, wherein the first signals are radio signals and the second signals are electrical signals.

4. The fishing lure of claim 2, additionally comprising a fishing rod with a handle associated with the fishing lure wherein the single thumb-controlled button remote control unit is disposed on the fishing rod generally near the handle.

5. The fishing lure of claim 1, wherein the controller is activated by an on/off switch and rechamed via a recharge port both mounted on the body.

6. The fishing lure of claim 1, wherein the motors are independently operable of each other by the controller, allowing for the fishing lure to be steered/maneuvered.

* * * * *